(12) United States Patent
Lyons et al.

(10) Patent No.: US 12,017,803 B2
(45) Date of Patent: Jun. 25, 2024

(54) SYSTEM AND METHOD FOR DEBRIS CAPTURE

(71) Applicants: Jackson Michael Lyons, Albany, NY (US); Kurt Anderson, Ballston Spa, NY (US)

(72) Inventors: Jackson Michael Lyons, Albany, NY (US); Kurt Anderson, Ballston Spa, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 91 days.

(21) Appl. No.: 17/875,543

(22) Filed: Jul. 28, 2022

(65) Prior Publication Data

US 2023/0036143 A1 Feb. 2, 2023

Related U.S. Application Data

(60) Provisional application No. 63/226,268, filed on Jul. 28, 2021.

(51) Int. Cl.
| | | |
|---|---|---|
| *B64G 1/10* | (2006.01) | |
| *B64G 1/24* | (2006.01) | |
| *B64G 1/36* | (2006.01) | |
| *B64G 1/66* | (2006.01) | |
| *G06F 16/904* | (2019.01) | |

(Continued)

(52) U.S. Cl.
CPC .......... *B64G 1/1078* (2013.01); *B64G 1/242* (2013.01); *B64G 1/36* (2013.01); *B64G 1/66* (2013.01); *G06F 16/904* (2019.01); *G06F 18/2111* (2023.01); *H02S 10/40* (2014.12); *B64G 1/245* (2023.08); *B64G 1/247* (2023.08)

(58) Field of Classification Search
CPC ........ B64G 1/1078; B64G 1/242; B64G 1/36; B64G 1/66; B64G 1/247; B64G 1/245; B64G 1/1081; H02S 10/40; G06F 16/904; G06F 18/2111
See application file for complete search history.

(56) References Cited

U.S. PATENT DOCUMENTS

| | | |
|---|---|---|
| 5,082,211 A | 1/1992 | Werka |
| 6,260,807 B1 | 7/2001 | Hoyt et al. |

(Continued)

*Primary Examiner* — Rodney A Bonnette
(74) *Attorney, Agent, or Firm* — Barclay Damon LLP; Anthony P. Gangemi (57) ABSTRACT

A method for capturing and deorbiting space debris includes: deploying a space debris capturing device in planetary orbit; receiving an initial target set including a first database of space debris targets that are within range of the space debris capturing device; performing a first algorithm to convert the initial target set to an accessible target set including a second database of space debris targets that are within range of the space debris capturing device; performing a second algorithm to convert the accessible target set to a final target set including a third database of space debris targets to be captured by the space debris capturing device capturing the first space debris target via a capture mechanism of the space debris capturing device; jettisoning the capture mechanism and the first captured space debris target into a decaying orbit; one of the remaining space debris targets of the third database; and positioning the space debris capturing device and the final captured space debris target into a decaying orbit.

14 Claims, 5 Drawing Sheets

(51) Int. Cl.
*G06F 18/2111* (2023.01)
*H02S 10/40* (2014.01)

(56) References Cited

U.S. PATENT DOCUMENTS

| | | |
|---|---|---|
| 6,830,222 B1 | 12/2004 | Nock et al. |
| 7,168,660 B2 | 1/2007 | Bischof et al. |
| 7,293,743 B2 | 11/2007 | Cepollina et al. |
| 7,686,255 B2 | 3/2010 | Harris |
| 8,628,044 B2 | 1/2014 | Poulos |
| 8,800,933 B2 | 8/2014 | Dunn |
| 8,882,048 B2 | 11/2014 | Levin et al. |
| 9,022,323 B2 | 5/2015 | Starke et al. |
| 9,302,789 B2 | 4/2016 | Hanada et al. |
| 9,463,884 B2 | 10/2016 | Kitazawa et al. |
| 9,731,844 B2 | 8/2017 | Allen et al. |
| 9,944,412 B2 | 4/2018 | Szabo et al. |
| 9,989,012 B2 | 6/2018 | Izumiyama et al. |
| 11,142,349 B2 * | 10/2021 | Barnes .................. B64G 7/00 |
| 2013/0075534 A1 | 3/2013 | Taylor et al. |
| 2013/0175401 A1 * | 7/2013 | Starke .................. B64G 1/40 244/171.1 |
| 2017/0297746 A1 * | 10/2017 | Amalric ................ B64G 1/244 |
| 2017/0313447 A1 | 11/2017 | Reed et al. |
| 2018/0127115 A1 * | 5/2018 | Choi .................... B64G 1/641 |
| 2018/0341894 A1 * | 11/2018 | Bunkheila ............ G06Q 10/063 |
| 2021/0292011 A1 * | 9/2021 | Limotta ................ B64G 1/242 |

* cited by examiner

SYSTEM AND METHOD FOR DEBRIS CAPTURE

CROSS REFERENCE TO RELATED APPLICATION(S)

This application claims the priority benefit of U.S. Provisional Patent Application No. 63/226,268, filed Jul. 28, 2021, which is incorporated by reference as if disclosed herein in its entirety.

FIELD

The present technology relates to the capture and removal of debris, particularly debris in space including obsolete satellites.

BACKGROUND

The amount of space debris orbiting the earth has been growing in an accelerating fashion since the launch of Sputnik in 1957. In 1978, NASA scientist Donald J. Kessler proposed the scenario that if the density of objects in low Earth orbit ("LEO") becomes high enough, then collisions between objects would cause a cascade, where each collision generates space debris that increases the likelihood of further collisions. This cascade of collisions and subsequent debris production could continue until large regions of space are rendered unusable by spacecraft. This is referred to as the Kessler Syndrome and evidence indicates that it has already begun.

Satellites in LEO face the growing threat of the above described space debris. Since the launch of Sputnik, more than 5,000 rockets have been launched with the goal of placing satellites into orbit. Many of these launches have left debris in various orbits around the Earth. To prevent problems from arising and/or worsening, steps must be taken to reduce the amount of debris in orbit around the earth. Many space agencies have set standards for deorbiting any debris that might be generated during a launch, but such standards have no effect on the debris already in orbit.

The European Space Agency ("ESA") currently estimates that there are around greater than 34,000 pieces of space debris larger than 10 cm, 900,000 pieces of space debris between 1 and 10 cm, and more than 150 million pieces of debris smaller than 1 cm. When a collision occurs, a piece of debris can potentially damage a spacecraft/satellite in the best case or destroy the spacecraft/satellite in the worst case.

What is needed, therefore, are improved systems and methods for space debris capture that addresses at least the problems described above.

SUMMARY

According to an embodiment of the present technology, a method for capturing and deorbiting space debris is provided. The method includes the steps of: providing a space debris capturing device; deploying the space debris capturing device in planetary orbit; determining, via an onboard global positioning system unit, the position and orbit velocity of the space debris capturing device; receiving an initial target set including a first database of space debris targets that are within range of the space debris capturing device; performing a first algorithm to convert the initial target set to an accessible target set including a second database of space debris targets that are within range of the space debris capturing device, the second database is smaller than the first database; performing a second algorithm to convert the accessible target set to a final target set including a third database of space debris targets to be captured by the space debris capturing device, the third database is smaller than the second database; transferring the space debris capturing device to a position within a capture range of a first space debris target of the third database; capturing the first space debris target via a capture mechanism of the space debris capturing device; jettisoning the capture mechanism and the first captured space debris target into a decaying orbit; repeating the transferring, capturing, and jettisoning steps for all but a final one of the remaining space debris targets of the third database; and positioning the space debris capturing device and the final captured space debris target into a decaying orbit.

In some embodiments, the first algorithm includes a filter-sorter algorithm.

In some embodiments, the data of the initial target set is in a two-line element format and the step of performing the first algorithm includes: extracting, for each space debris target of the first database, classical orbit elements from indices of the two-line element formatted data; calculating, for each space debris target of the first database, the delta-V required to transfer the space capturing device to the position within the capture range of the respective space debris target; deleting the data of any space debris target of the first database for which the respective calculated transfer delta-V exceeds a predetermined value; and outputting the accessible target set.

In some embodiments, calculating the transfer delta-V includes calculating the delta-V required for a two-burn non-Hohmann transfer between two inclined elliptical orbits having arbitrarily oriented apse lines.

In some embodiments, the first database includes at least ten thousand space debris targets and the second database includes less than one hundred space debris targets.

In some embodiments, the second algorithm includes a genetic algorithm.

In some embodiments, the step of performing the second algorithm includes: receiving space debris capture parameters including a total propellant budget, a total number of space debris targets for capture, and a maximum weight that can be supported by the capture mechanism; receiving the accessible target set and loading the data for each space debris target of the second database into a parameter matrix; scoring each space debris target of the second database via a fitness function of the genetic algorithm; defining lower and upper bound constraints for a non-linear constraint function of the genetic algorithm; performing the genetic algorithm for each space debris target of the second database using the scored fitness function and the non-linear constraint function; ranking each space debris target of the second database based on the space debris capture parameters; deleting the data of any space debris target of the second database for which the respective ranking exceeds the total number of space debris targets for capture; and outputting the final target set.

In some embodiments, the third database includes no more than four space debris targets.

In some embodiments, the space debris capture device includes a debris capture module housing the capture mechanism, a control module, and a propulsion module configured to adjust the position of the space debris capture device in space.

In some embodiments, the space debris capture device includes at least one solar array configured to provide electrical power to the space debris capture device.

In some embodiments, the capture mechanism includes at least one capture barrel, at least one capture net configured to fit within a first chamber of the capture barrel, an electromagnetic tether attached to a first end of the capture net, a power source configured to fit within a second chamber of the capture barrel and configured to provide electrical power to the electromagnetic tether, a set of carry-weights attached to the capture net, and a set of springs associated with the set of carry-weights. The set of springs is configured to exert a force on the carry-weights sufficient to launch the capture net from the capture barrel.

In some embodiments, the step of capturing the first space debris target includes releasing the set of springs to launch the capture net from the capture barrel; carrying, via the momentum of the carry-weights, the capture net toward the first space debris target and pulling, via the momentum of the carry-weights, the capture net into an open configuration; entangling the capture net around the first space debris target; and securing the capture net around the first space debris target via hook-and-loop fasteners attached to the carry-weights that engage associated hook-and-loop fasteners of the entangled capture net.

In some embodiments, the capture range is about two meters.

In some embodiments, the space debris targets are in low Earth orbit.

Further objects, aspects, features, and embodiments of the present technology will be apparent from the drawing Figures and below description.

BRIEF DESCRIPTION OF DRAWINGS

Some embodiments of the present technology are illustrated as an example and are not limited by the figures of the accompanying drawings, in which like references may indicate similar elements.

DETAILED DESCRIPTION

Figure 1A:
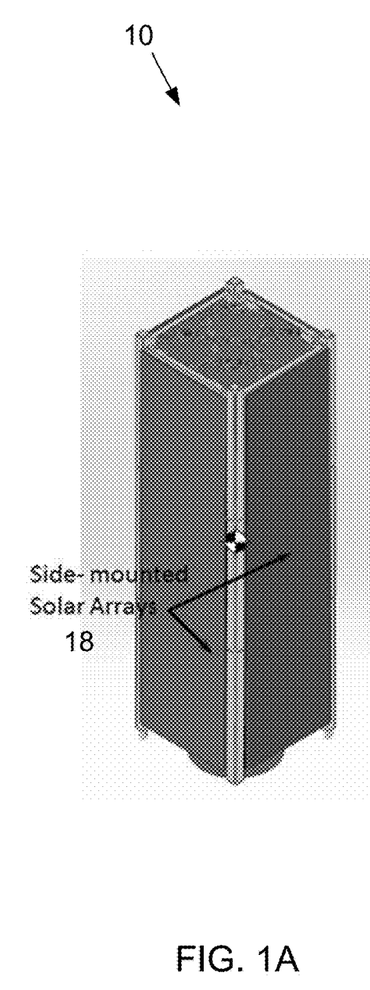
FIG. 1A is a side isometric view of a space debris capturing device according to an embodiment of the present technology.

As shown in FIGS. 1A-3, a space debris capture device (also referred to herein as "OSCaR") is generally designated by the numeral 10. The space debris capture device 10 is configured to find, capture, and remove multiple pieces of space debris, before the space debris capture device 10 deorbits itself. In some embodiments, the space debris capture device 10 is a 3-unit CubeSat device that includes a debris capture module 12, a control module 14, and a propulsion module 16, as shown in FIGS. 1A-1C. CubeSats are comparatively small satellites (each unit of a CubeSat is defined to be 10 cm×10 cm×10 cm, with a total associated mass of less than 1.3 kg). Because of their small size, CubeSats can hitchhike to orbit by riding into orbit as a secondary payload. Specifically, the primary payload (e.g., a larger, more expensive satellite) pays for the launch and choses the destination orbit. The CubeSat gets to ride up at a greatly discounted cost (effectively free), but does not get to choose the destination orbit. The CubeSats are then deployed after the primary payload has been placed in its destination orbit (and is safely away from the boost vehicle still containing the CubeSate). As such, CubeSats offer a means to get comparatively small and inexpensive spacecraft into space.

Figures 1B, 1C:
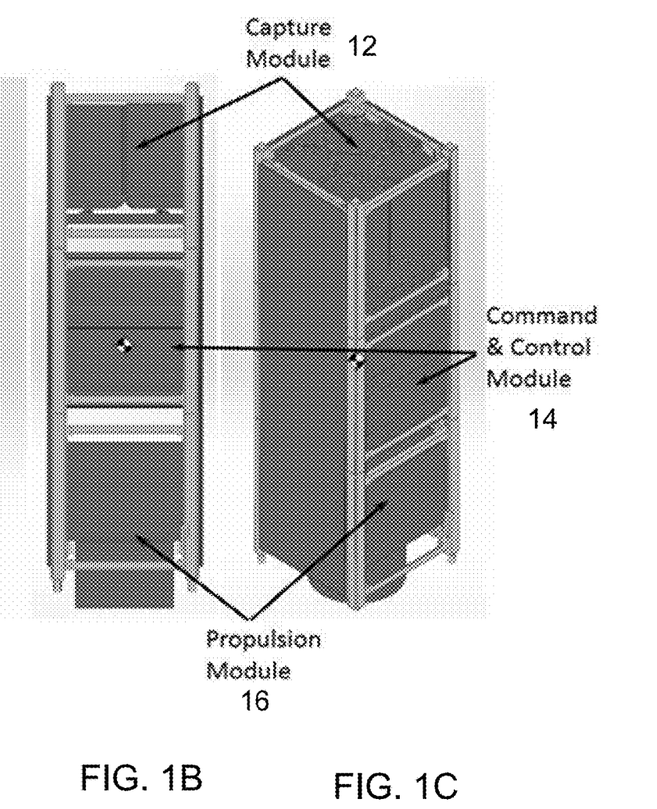
FIG. 1B is a front isometric view of the space debris capturing device of FIG. 1A.
FIG. 1C is a side isometric view of the space debris capturing device of FIG. 1A.

In some embodiments, the space debris capture device 10 includes at least one solar array 18 mounted on at least one side thereof. The solar arrays 18 are configured to capture solar radiation and produce and provide electrical power to the space debris capture device 10. The propulsion module 16 is configured to move, transfer, adjust the positionings of the space debris capture device 10 in space. In some embodiments, the propulsion module 16 is a hot gas "Green Propellant" CubeSat compatible unit. The control module 14 includes a computer system (e.g., a processor, a memory, a storage device, a communication system, a global positioning system ("GPS"), power management, etc.) that is configured to communicate with a ground station network and execute instructions for the operation of the space debris capture device 10. In some embodiments, the control module 14 is a CubeSat Command and Control module.

Figure 2:
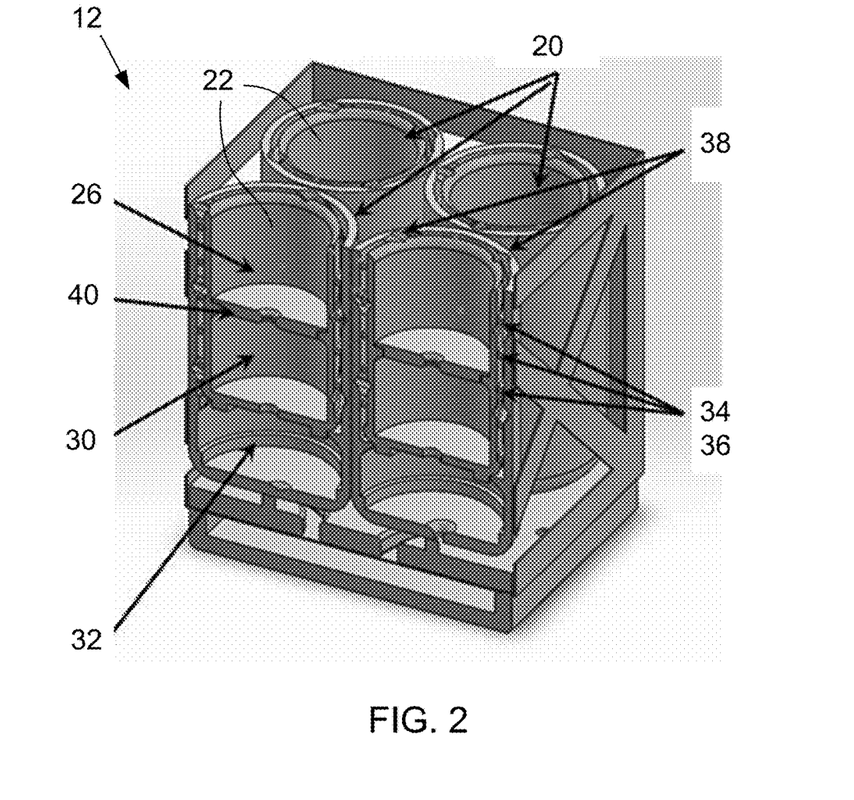
FIG. 2 is an isometric partial cross-sectional view of the debris capture module of a space debris capturing device according to an embodiment of the present technology.
Figure 3:
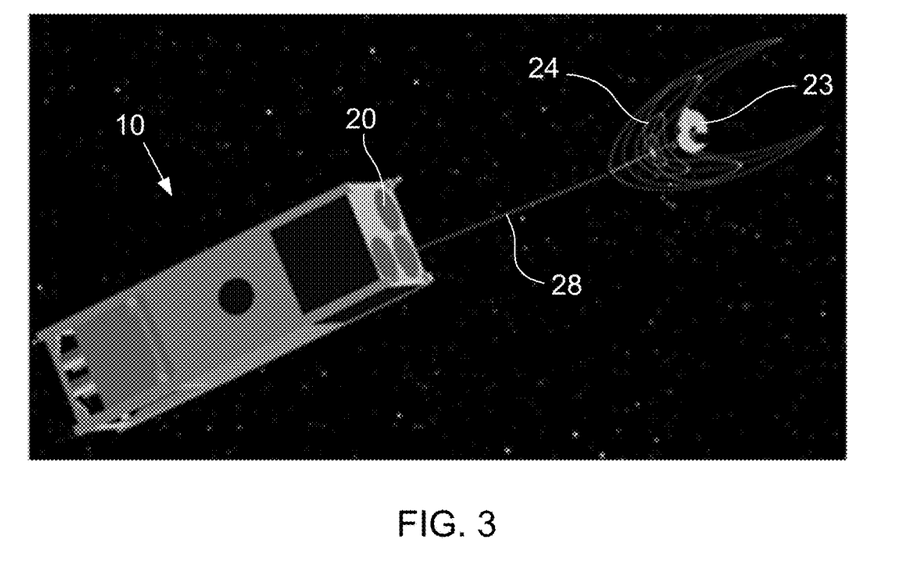
FIG. 3 is an isometric view of a space debris capturing device in the process of capturing a piece of space debris with a capture net according to an embodiment of the present technology.

As shown in FIGS. 2-3, in some embodiments the debris capture module 12 includes up to four capture mechanisms 20. Each capture mechanism 20 includes a capture barrel 22 that is configured to capture and deorbit one piece of space debris 23. In some embodiments, the capture barrel 22 is configured to capture a piece of space debris in the size range of 10 cm to 20 cm with a mass of less than 1 kg. However, the present technology is not limited in this regard and contemplates embodiments in which the capture barrel 22 is configured to capture pieces of space debris having greater or smaller sizes and greater or smaller masses. In some embodiments, each capture barrel 22 contains an approximately 50 cm×50 cm capture net 24 in an upper chamber 26. The capture net 24 is then connected securely to one end of an electromagnetic drag tether 28 that resides in a middle chamber 30 of the capture barrel 22. The opposite end of the coiled electromagnetic drag tether 28 is connected securely to a battery pack that resides in a lower chamber 32 of the capture barrel 22. A set of carry-weights 34 is connected to the capture net 24 and a set of ejection springs 36 is associated with the set of carry-weights 34. The set of carry-weights 34 and the set of ejection springs 36 reside adjacent to each other in a perimeter channel 38 of the capture barrel 22. The set of ejection springs 36 is configured to exert a force on the set of carry-weights 34 that is sufficient to launch the capture net 24 from the capture barrel 22. In some embodiments, removable separators 40 are located between the upper chamber 26 and the middle chamber 30, and between the middle chamber 30 and the lower chamber 32. Once the net-tether-battery system is deployed the batteries energize the electromagnetic drag tether 28, thereby greatly accelerating the rate at which the battery pack, tether, net, and captured debris system is deorbited. The electromagnetic drag tether 28 interacts with the Earth's magnetic field, producing an electromagnetic drag force which slow the tether-debris system so that it drops to a lower orbit. Once the batteries are drained, the electromagnetic drag tether 28 still provides a passive electromagnetic drag force due to this interaction with the Earth's magnetic field. The system is then further slowed by the upper atmosphere. The tether-net-debris system is ultimately slowed to the point that its orbit rapidly decays, and the battery-tether-debris system disintegrates or burns-up in the atmosphere like a meteor.

According to another embodiment of the present technology, a method for space debris acquisition, including rendezvous, capture, and deorbit, is provided. OSCaR 10, as discussed herein, is carried into orbit of a planet (e.g., planetary orbit of Earth) and is deployed from, for example, a boost vehicle via P-Pod type deployer, and becomes active. OSCaR 10 then determines its position and velocity via an onboard GPS unit. Based on these initial measurements, OSCaR 10 estimates its orbit parameters and determines when it will be sufficiently near an associated ground station to transmit orbit data and receive further instruction. When sufficiently in range of the ground station, OSCaR 10 transmits its latest orbit position, velocity information, and estimated orbit parameters to the ground station. The ground station crew then verifies and refines OSCaR's 10 orbit elements so that the ground crew can then accurately predict OSCaR's 10 behavior and propellant requirements and limitations.

Based on these results (e.g., OSCaR's 10 behavior and propellant requirements and limitations), the ground crew access the NORAD and ESA space debris databases and determines which regions of space are both reachable by OSCaR 10 and offer multiple pieces of space debris that OSCaR 10 will likely be able to find, capture, and deorbit. In some embodiments, the targeted space debris are in low Earth orbit. These results form an initial target set of a first database of space debris targets that are within range of OSCaR 10. The ground crew then performs an optimization analysis to identify the "best" pieces of space debris to target. "Best" in this context means those pieces of debris which provide the optimum combination of: the ability of OSCaR 10 to find and capture the target debris based on the tracking data available; the estimated amount of propellant needed to find, capture, and deorbit the pieces of debris; and the perceived value of the target debris (i.e., some debris is more desirable to deorbit than others). In some embodiments, the optimization analysis includes running a first algorithm (as discussed in detail below) to convert the initial target set to an accessible target set that includes a second database of space debris targets that are within range of OSCaR 10. In some embodiments, the optimization analysis further includes running a second algorithm (as discussed in detail below) to convert the accessible target set to a final target set that includes a third database of space debris targets to be captured by OSCaR 10. The second database of space debris targets is smaller than the first database of space debris targets, and the third database of space debris targets is smaller than the second database of space debris targets. Preferably, the third database of space debris targets matches, or is limited to, the number of capture mechanisms 20 of OSCaR 10 (e.g., four or less) such that OSCaR 10 knows exactly which pieces of space debris it is capturing and deorbiting.

After the space debris targets are determined and communicated to OSCaR 10, OSCaR 10 transfers, moves, adjusts its positioning to the region of space that is expected to contain the first piece of target debris. OSCaR 10 then uses a combination of onboard optical and thermal imaging devices in conjunction with a third algorithm to find and estimate the target debris orbit parameters. OSCaR 10 then begins the rendezvous by moving to a location determined by this analysis which is more near the target. OSCaR 10 then repeats the target orbit parameter estimation/determination from this new location to improve its knowledge of the target's location and orbit trajectory. OSCaR 10 then repeats these steps as need until the target's location is near certain and within 50 meters of OSCaR 10. OSCaR 10 then uses onboard RADAR and/or LiDAR units to identify the location and velocity of the target debris relative to OSCaR to cm level accuracy. OSCaR 10 then closes to ~2 meters from target debris and begins final targeting and capture maneuvers.

OSCaR 10 then fires one of its capture mechanisms 20. As discussed above, firing the capture mechanism 20 includes releasing the set of ejection springs 36 to launch the set of carry-weights 34 and the capture net 24 from the capture barrel 22. In some embodiments, the set of carry-weights 34 includes four carry-weights 34, each of which are attached by a Kevlar thread to a respective corner of the capture net 24. The momentum of the carry-weights 34 pulls the capture net 24 from the capture barrel 22, carries the capture net 24 toward the target debris, partially pulls out the electromagnetic drag tether 28, and pulls the capture net 24 into an open configuration to entangle it around the target debris, as shown in FIG. 3. In some embodiments, hook-and-loop fasteners on the carry-weights 34 engage associated hook-and-loop fastener (e.g., attachment threads) on the capture net 24 to secure the capture net 24 around the target debris. OSCaR 10 then pulls away from the captured target debris extending most of the electromagnetic drag tether 28. OSCaR 10 then jettisons the spent capture barrel 22 with is associated battery pack, which energizes the electromagnetic drag tether 28 and positions the net-debris system into a decaying orbit, as discussed above. With OSCaR 10 now completely separated from the captured target debris, OSCaR 10 repeats the above steps to move, locate, capture, and jettison the remaining pieces of target debris. In some embodiments, the final captured target debris is not jettisoned, but remains attached to OSCaR 10 via a non-electromagnetic drag tether, such as a Kevlar cord. OSCaR 10 then uses its remaining propellant (which has been held in reserve for this purpose) to position itself and the final captured target debris into a decaying orbit (e.g., an orbit that will quickly decay due to aerodynamic drag. Thus, within a span of about two to five years, all pieces of captured space debris and OSCaR 10 will have deorbited and disintegrated in the Earth's atmosphere during reentry.

In some embodiments, the first algorithm is a filter-sorter program designed to produce a reduced set of accessible rendezvous targets from a database file of debris targets, an initial set of orbital parameters for OSCaR 10, and an onboard fuel budget for OSCaR 10. In some embodiments, the first algorithm includes the following steps. First, a suitable target set is obtained from existing databases. Second, the data thus obtained is manipulated to produce classical orbital parameters in a convenient format for large-scale processing. Third, an algorithmic method of calculating the delta-V required to reach a target orbit is used. Finally, the data set is cleared of impractical targets and provided in a convenient format for later processing.

Orbital ephemeris data can be retrieved from several sources, including the ESA and NORAD. These databases usually store the ephemeris data for observed satellites and debris in the two-line element ("TLE") format. For the first step of the process, the acquisition of orbital data for debris, a program is used to scan these TLE databases for debris appearing after a given date, and a data file is populated with the TLE data thus retrieved.

The second and fourth steps of the process are handled in the wrapper script, which intakes the TLE data file, processes it into a useful format, passes it to the calculation algorithm, and then cleans the resultant data of target orbits which the spacecraft cannot reach. It also contains the user-input orbital parameters and delta-V (i.e., the measure of impulse per unit of spacecraft mass that is needed to perform a maneuver) budget of OSCaR 10. The processing of the incoming data is the extraction of the classical orbit elements from the appropriate indices of the TLE-formatted data set to pass to the delta-V calculation. Once transfer delta-V has been calculated for each orbit, the orbits with excessive transfer costs are deleted from the final output file.

The main objective of the filter-sorter algorithm (i.e., the first algorithm) is to provide a timely, accurate estimation of the delta-V cost to access any given piece of debris from a given initial spacecraft orbit. To make this estimate, some trajectory method must be chosen which suits the most likely maneuvers which will be needed to access the debris. While a Hohmann or Hohmann-like transfer orbit is usually optimal for co-planar initial and final orbits, in the case of orbital debris rendezvous it is likely that the debris will be out-of-plane with respect to the initial orbit of the spacecraft, and will have randomly oriented apse lines.

Figure 4:
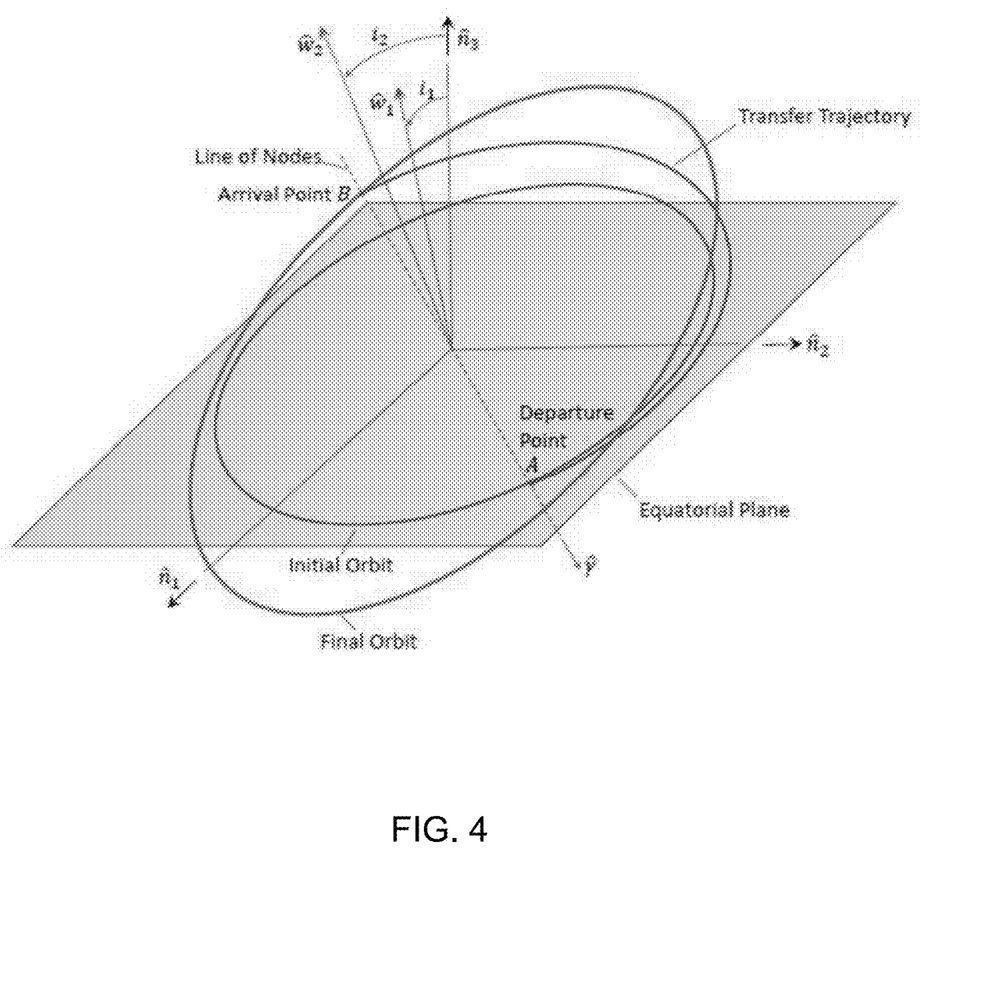
FIG. 4 is a chart of an exemplary inclined orbit showing relevant unit vectors and angles.

In most cases for a non-Hohmann orbital transfer, time-optimal transfers are preferred. These transfer maneuvers are usually calculated by a method which iteratively solves Lambert's problem. However, while these solutions are good for exact intercepts between spacecraft, they are computationally intensive due to their iterative nature. Therefore, an analytical method of trajectory and delta-V calculation was derived to save computational time for the purposes of the initial filter-sorter algorithm (i.e., the first algorithm). Thus, the first algorithm includes a calculation of the delta-V required for a two-burn non-Hohmann transfer between two inclined elliptical orbits, called orbits 1 and 2, where these orbits have arbitrarily oriented apse lines. The departure burn occurs at a point on the line of nodes on the initial orbit, and the insertion burn occurs at a point on the line of nodes on the other orbit, nominally the final orbit, opposing the initial point, as shown in FIG. 4.

The filter-sorter algorithm (i.e., the first algorithm) is configured to reduce orbital debris ephemeris data files down to a size suitable for use by a more complex and accurate analysis method (e.g., the second algorithm discussed below) designed to select the targets and generate maneuvers for OSCaR 10. In one exemplary embodiment, with a 450 m/s fuel budget allocated for OSCaR 10, fewer than 100 debris items were found for any initial orbit out of an initial database of 10,400 debris TLE files.

In some embodiment, the second algorithm is a genetic algorithm ("GA"). A GA is a gradient-free method of optimization which simulates evolution. A GA generates an initial population and creates new generations based on assigned fitness values for members of the population. The GA continues to create new generations whose mean fitness should continuously improves until some convergence criteria is met.

Figure 5:
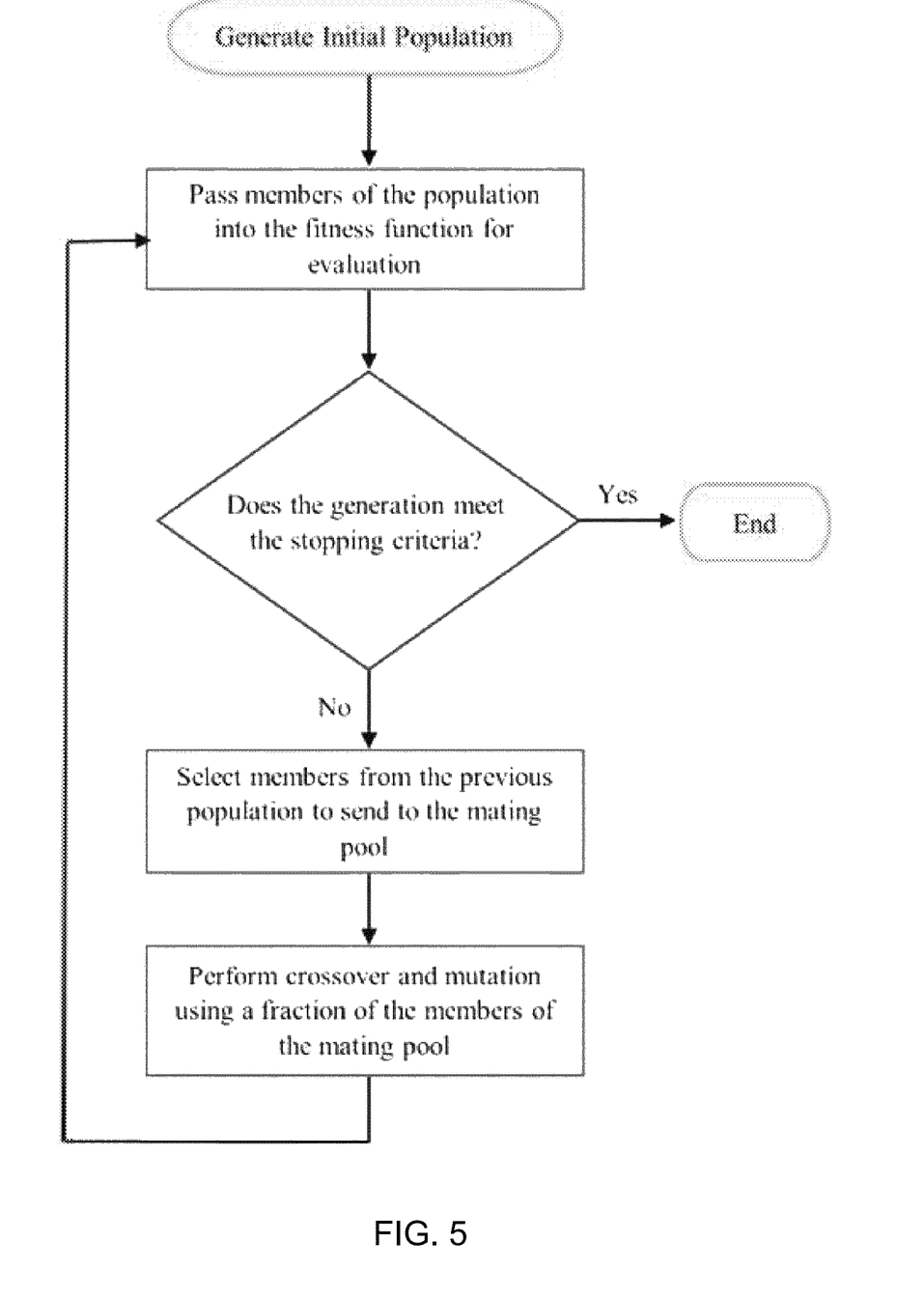
FIG. 5 is a flow chart showing the process of running a general genetic algorithm.

FIG. 5 is a flow chart showing the general process of a GA. A GA generates an initial population either randomly or with seed designs. Seed designs are predetermined good designs for the system which are passed to the GA to expedite the convergence process or ensure a better final generation. The GA evaluates the fitness of the initial population first.

A fitness function, or cost function, scores the population member. A fitness function gives the GA a value for the population member to compare to the whole population. This score helps the algorithm determine if the member should be passed onto the mating pool. The member's fitness may also indicate that the GA should remove the member from the population. Typically, the higher a fitness value, the better the design. A fitness function may also be defined as a cost function. Generally, a member is considered a better design if the member's cost is lower than other members of a population.

Once the initial population's fitness has been evaluated, the GA performs selection, crossover, and mutation for the subsequent iteration. In this process, the GA selects members from the initial population to move forward into the next generation. A member with a higher fitness score than others is assigned a greater probability of selection. The GA selects members to pass onto a mating pool before the program reevaluates the generation fitness. The mating pool ultimately becomes the next generation for the GA to evaluate. In the mating pool, two operations are performed on the selected members. The first is crossover. Crossover is a process where two parents are selected from the mating pool, two random sites on the parents' genetic string are chosen, and the parents swap the binary strings with one another at that site. The second operation is mutation. During mutation, a fraction of the members of the mating pool are chosen to invert a binary string at a randomly selected site in the members' genetic string. Once crossover and mutation are complete, the GA reevaluates the fitness of the new generation. This entire process is repeated until a specified stopping criteria is met.

A GA continues to create new generations and evaluate member fitness until some stopping criteria is met. Stopping criteria is program specific and can be user specified. Some examples of stopping criteria include creating new generations until the best value of each generation is no longer updated after so many iterations, creating new generations until a certain number of generations is reached, creating new generations until a certain number of stall generations is reached, and so on.

Figure 6:
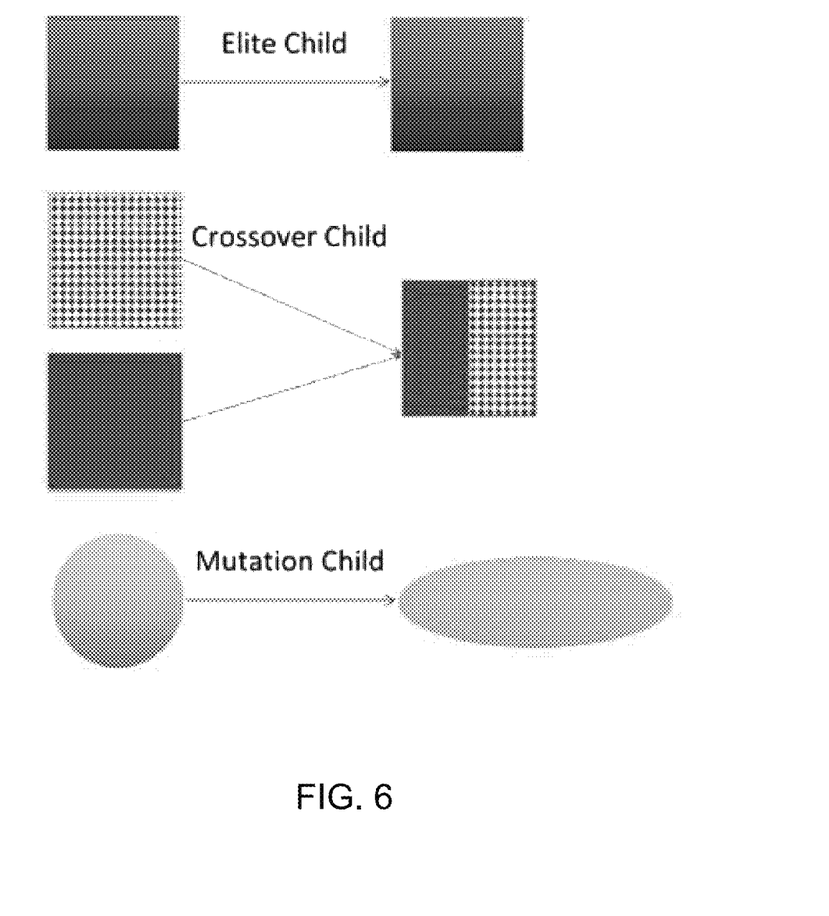
FIG. 6 is a schematic showing how members in a mating pool of a general genetic algorithm are modified for a new generation.

In some embodiments, the GA performs the following steps to create new generations: score each member of the current population by computing its fitness value (called raw fitness scores); scaling the raw fitness scores to convert them into a more usable range of values (called expectation values); selecting members, called parents, based on their expectation; choosing some of the individuals in the current population that have lower fitness as elite, and passing the elites to the next population; producing children from the parents either by making random changes to a single parent (called mutation) or by combining the vector entries of a pair of parents (called crossover); replacing the current population with the children to form the next generation; and stopping the algorithm when one of the stopping criteria is met. FIG. 6 shows how selection, crossover, and mutation is performed by a GA in general.

In some embodiments, the second algorithm performs target selection for OSCaR 10 during the ground-station communication phase of OSCaR's 10 mission. In some embodiments, the command module 14 is configured to retrieve the initial target set and perform the first algorithm and the second algorithm without further communication from the ground station. Ultimately, target selection by the second algorithm is a combinatory process where debris targets are randomly groups and scored then reproduced until an ideal combination is selected. In some embodiments, the second algorithm (the genetic algorithm) permits OSCaR 10 (and the associated ground crew) to perform debris target selection according to the following steps. The second algorithm first requests the user to input total propellant budget in meters per second (m/s), the number of desired objects for OSCaR 10 to target, and the weight each individual tether can carry in kg. The second algorithm then loads an array containing relevant design variable parameters which has either already been sorted for which debris targets are within range for OSCaR 10 to target, such as the accessible target set outputted from the first algorithm discussed above. In some embodiments, the loaded array contains a complete set or list of debris targets that have not undergone a presort. In such embodiments, the GA performs a sorting function to calculate the least amount of propellant required to perform orbital transfer between two orbits using the Keplerian orbital elements, and to calculate the remaining propellant budget after OSCaR 10 reaches the same orbit as the debris target (i.e., in some embodiments the first algorithm is not performed separately and/or is performed as part of the second algorithm).

Once the second algorithm loads the array (e.g., a parameter matrix) containing relevant debris target parameters and propellant budgets, the second algorithm calls the fitness function to score objects. The second algorithm defines lower and upper bound constraints for the design variables. In some embodiments, these constraints are one and the number of rows in the array, respectively, to ensure design variables outside the array are not selected.

The second algorithm then begins operation using the defined fitness function and non-linear constraint function. In some embodiments, the GA options are set to various maximum stall generations and maximum generations based on the number of debris targets to capture. As the GA runs, an optimizer displays iteration information and plots the best and mean member values for each generation.

Finally, the second algorithm outputs the total number of generations, the best fitness function value, the number of function evaluations performed, the names (e.g., NORAD ID numbers) for the debris target selections ranked in order of first to last, and the remaining propellant budget after entering all debris target orbits. In some embodiments, the ranked debris targets includes all debris targets from the second database of the accessible target set, and the second algorithm reduces this set by deleting the data of any debris target for which the respective ranking exceeds the total number of debris targets designated for capture by OSCaR 10. This reduced set forms the third database of final debris targets for capture and is then outputted as the final target set. Preferably, the final target set matches the number of capture mechanisms 20 of OSCaR 10. In some embodiments, the final target set has no more than four debris targets for capture.

As will be apparent to those skilled in the art, various modifications, adaptations, and variations of the foregoing specific disclosure can be made without departing from the scope of the technology claimed herein. The various features and elements of the technology described herein may be combined in a manner different than the specific examples described or claimed herein without departing from the scope of the technology. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the technology.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents of carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the technology encompasses not only the entire group listed as a whole, but each member of the group individually and all possible subgroups of the main group. Additionally, for all purposes, the technology encompasses not only the main group, but also the main group absent one or more of the group members. The technology therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A method for capturing and deorbiting space debris, the method comprising:
    providing a space debris capturing device;
    deploying the space debris capturing device in planetary orbit;
    determining, via an onboard global positioning system unit, the position and orbit velocity of the space debris capturing device;
    receiving an initial target set comprising a first database of space debris targets that are within range of the space debris capturing device;
    performing a first algorithm to convert the initial target set to an accessible target set comprising a second database of space debris targets that are within range of the space debris capturing device, the second database is smaller than the first database;
    performing a second algorithm to convert the accessible target set to a final target set comprising a third database of space debris targets to be captured by the space debris capturing device, the third database is smaller than the second database;
    transferring the space debris capturing device to a position within a capture range of a first space debris target of the third database;
    capturing the first space debris target via a capture mechanism of the space debris capturing device;
    jettisoning the capture mechanism and the first captured space debris target into a decaying orbit;
    repeating the transferring, capturing, and jettisoning steps for all but a final one of the remaining space debris targets of the third database; and
    positioning the space debris capturing device and the final captured space debris target into a decaying orbit.

2. The method for capturing and deorbiting space debris of claim 1, wherein the first algorithm comprises a filter-sorter algorithm.

3. The method for capturing and deorbiting space debris of claim 1, wherein the data of the initial target set is in a two-line element format and wherein performing the first algorithm comprises:
    extracting, for each space debris target of the first database, classical orbit elements from indices of the two-line element formatted data;
    calculating, for each space debris target of the first database, the delta-V required to transfer the space capturing device to the position within the capture range of the respective space debris target;
    deleting the data of any space debris target of the first database for which the respective calculated transfer delta-V exceeds a predetermined value; and
    outputting the accessible target set.

4. The method for capturing and deorbiting space debris of claim 3, wherein calculating the transfer delta-V comprises calculating the delta-V required for a two-burn non-Hohmann transfer between two inclined elliptical orbits having arbitrarily oriented apse lines.

5. The method for capturing and deorbiting space debris of claim 3, wherein the first database comprises at least ten thousand space debris targets and the second database comprises less than one hundred space debris targets.

6. The method for capturing and deorbiting space debris of claim 1, wherein the second algorithm comprises a genetic algorithm.

7. The method for capturing and deorbiting space debris of claim 6, wherein performing the second algorithm comprises:
    receiving space debris capture parameters comprising a total propellant budget, a total number of space debris targets for capture, and a maximum weight that can be supported by the capture mechanism;
    receiving the accessible target set and loading the data for each space debris target of the second database into a parameter matrix;
    scoring each space debris target of the second database via a fitness function of the genetic algorithm;
    defining lower and upper bound constraints for a non-linear constraint function of the genetic algorithm;
    performing the genetic algorithm for each space debris target of the second database using the scored fitness function and the non-linear constraint function;
    ranking each space debris target of the second database based on the space debris capture parameters;
    deleting the data of any space debris target of the second database for which the respective ranking exceeds the total number of space debris targets for capture; and
    outputting the final target set.

8. The method for capturing and deorbiting space debris of claim 7, wherein the third database comprises no more than four space debris targets.

9. The method for capturing and deorbiting space debris of claim 1, wherein the space debris capture device comprises:
    a debris capture module housing the capture mechanism;
    a control module; and
    a propulsion module configured to adjust the position of the space debris capture device in space.

10. The method for capturing and deorbiting space debris of claim 9, wherein the space debris capture device further comprises at least one solar array configured to provide electrical power to the space debris capture device.

11. The method for capturing and deorbiting space debris of claim 9, wherein the capture mechanism comprises:
    at least one capture barrel;
    at least one capture net configured to fit within a first chamber of the capture barrel;
    an electromagnetic tether attached to a first end of the capture net;
    a power source configured to fit within a second chamber of the capture barrel and configured to provide electrical power to the electromagnetic tether;
    a set of carry-weights attached to the capture net; and a set of springs associated with the set of carry-weights, the set of springs is configured to exert a force on the carry-weights sufficient to launch the capture net from the capture barrel.

12. The method for capturing and deorbiting space debris of claim 11, wherein capturing the first space debris target comprises:
- releasing the set of springs to launch the capture net from the capture barrel;
- carrying, via the momentum of the carry-weights, the capture net toward the first space debris target and pulling, via the momentum of the carry-weights, the capture net into an open configuration;
- entangling the capture net around the first space debris target; and
- securing the capture net around the first space debris target via hook-and-loop fasteners attached to the carry-weights that engage associated hook-and-loop fasteners of the entangled capture net.

13. The method for capturing and deorbiting space debris of claim 1, wherein the capture range is about two meters.

14. The method for capturing and deorbiting space debris of claim 1, wherein the space debris targets are in low Earth orbit.

\* \* \* \* \*